(12) United States Patent
Duval et al.

(10) Patent No.: US 12,395,359 B2
(45) Date of Patent: Aug. 19, 2025

(54) METHOD OF IMPLEMENTING A PHYSICAL UNCLONABLE FUNCTION

(71) Applicant: THALES DIS FRANCE SAS, Meudon (FR)

(72) Inventors: Benjamin Duval, Saint Maximin (FR); Alexandre Berzati, Fuveau (FR); Olivier Fourquin, Fuveau (FR)

(73) Assignee: THALES DIS FRANCE SAS, Meudon (FR)

( * ) Notice: Subject to any disclaimer, the term of this patent is extended or adjusted under 35 U.S.C. 154(b) by 175 days.

(21) Appl. No.: 18/026,925

(22) PCT Filed: Sep. 17, 2021

(86) PCT No.: PCT/EP2021/075725
§ 371 (c)(1),
(2) Date: Mar. 17, 2023

(87) PCT Pub. No.: WO2022/058567
PCT Pub. Date: Mar. 24, 2022

(65) Prior Publication Data
US 2023/0327891 A1    Oct. 12, 2023

(30) Foreign Application Priority Data

Sep. 18, 2020 (EP) .................................... 20315413

(51) Int. Cl.
*H04L 29/06* (2006.01)
*H04L 9/32* (2006.01)

(52) U.S. Cl.
CPC .................. *H04L 9/3278* (2013.01)

(58) Field of Classification Search
CPC . H04L 1/00; H04L 13/00; H04L 17/00; H04L 2209/34; H04L 9/3278
See application file for complete search history.

(56) References Cited

U.S. PATENT DOCUMENTS 8,918,647 B1 * 12/2014 Wallrabenstein ..... H04L 63/061
                                                         713/172
9,703,989 B1    7/2017 Pedersen
(Continued)

OTHER PUBLICATIONS

International Search Report (PCT/ISA/220) and Written Opinion (PCT/ISA/237) mailed on Oct. 20, 2021, by the European Patent Office as the International Searching Authority for current International Application No. PCT/EP2021/075725—[14 pages].

*Primary Examiner* — Mahfuzur Rahman

(57) ABSTRACT

Provided is an electronic device and a method thereof for repairing response bits of a physical unclonable function of an electronic device, said physical unclonable function outputting said response bits and additional output bits. The method includes generating a PUF response from said response bits (S1), detecting an error in the PUF response (S2), determining erroneous response bits of the PUF response (S3), determining a match (S4) between each determined erroneous response bit and a selected additional output bit such that replacing the erroneous response bits by the matching additional output bits corrects the error in the PUF response, storing said determined match in a repair list (S5), and replacing (S6) in the PUF response said erroneous response bits with the matching additional output bits in the repair list. Other embodiments disclosed.

14 Claims, 3 Drawing Sheets

(56) References Cited

U.S. PATENT DOCUMENTS

| | | | |
|---|---|---|---|
| 2008/0279373 A1* | 11/2008 | Erhart | H04L 9/3249 714/E11.017 |
| 2010/0031065 A1 | 2/2010 | Futa et al. | |
| 2011/0002461 A1* | 1/2011 | Erhart | G06F 21/73 340/5.83 |
| 2011/0066670 A1* | 3/2011 | Yu | G06F 7/582 708/254 |
| 2013/0010957 A1* | 1/2013 | Yu | H04L 9/0844 380/260 |
| 2013/0254636 A1 | 9/2013 | Kirkpatrick et al. | |
| 2015/0092939 A1* | 4/2015 | Gotze | G09C 1/00 380/2 |
| 2015/0312047 A1* | 10/2015 | Suzuki | H04L 9/3278 713/192 |
| 2016/0087805 A1 | 3/2016 | Li et al. | |
| 2016/0156476 A1* | 6/2016 | Lee | H04L 9/0866 380/44 |
| 2017/0149572 A1* | 5/2017 | Wallrabenstein | H03K 19/17748 |
| 2017/0310489 A1* | 10/2017 | Van Der Sluis | H04L 9/3278 |
| 2019/0065734 A1* | 2/2019 | Yao | G06F 21/31 |
| 2020/0044872 A1* | 2/2020 | Willsch | H04L 9/3278 |

* cited by examiner

METHOD OF IMPLEMENTING A PHYSICAL UNCLONABLE FUNCTION

FIELD OF THE INVENTION

The present invention relates to a method for implementing a Physically Unclonable Function (PUF). It relates particularly to a method for repairing the response provided by such a PUF after some output bits of the PUF have undergone permanent damage.

BACKGROUND OF THE INVENTION

A Physically Unclonable Function (PUF) is a function embodied in a physical device whose output depends on the microstructures of the device components generating it. The intrinsic PUF microstructures characteristics depend on random process variations during manufacture that are uncontrolled and cannot be monitored. Hence, when a physical stimulus is applied to the device components, they react in an unpredictable way due to the complex interaction of the stimulus with the physical microstructure of the components. Such a PUF is therefore easy to evaluate but practically impossible to predict or duplicate, even knowing the exact manufacturing process that produced it. The applied stimulus is called the challenge, and the reaction of the PUF is called the response. A specific challenge and its corresponding response together form a challenge-response pair which is specific to a given device and may be used for example as a seed for cryptographic applications or for authentication of the PUF device.

A PUF of a chip may be based on its electronic components. For example a PUF output bit may be generated from the difference between the outputs of a pair of electronic components called primitives. Given the natural variations in the behavior of electronic components (especially due to environmental conditions like temperature or power supply), a PUF response may not always be the same for a given challenge. In order to avoid errors in a process based on a PUF response, such as authentication, such a challenge-response pair must be steady. An existing method for making the PUF response to a reference challenge as steady as possible is to use for the PUF response only output bits for which primitives output difference is far enough from the 0/1 digitalization threshold. By doing so, small variations in primitive outputs difference for the selected bits, due to electronic noise for example, do not lead to a toggling of the output bits.

Unfortunately, primitives output may be subject to stronger variations, strong enough to make output bits selected for the PUF response toggle or to permanently change their value. For example electrical component microstructure may be damaged by ageing or by physical attacks such as fault injection by laser attack.

As a result, there is a need for a method enabling to repair the response bits of a PUF when primitives forming the PUF response suffer from damage making the output bits unsteady or permanently modifying their value.

SUMMARY OF THE INVENTION

The invention aims at solving the above mentioned technical problem.

For this purpose and according to a first aspect, this invention therefore relates to a method for repairing response bits of a physical unclonable function of an electronic device, said physical unclonable function outputting said response bits and additional output bits, said method comprising the following steps:
generating a PUF response from said response bits,
detecting an error in the PUF response,
determining erroneous response bits of the PUF response,
determining a match between each determined erroneous response bit and a selected additional output bit such that replacing the erroneous response bits by the matching additional output bits corrects the error in the PUF response,
storing said determined match in a repair list,
replacing in the PUF response said erroneous response bits with the matching additional output bits in the repair list.

By doing so, erroneous bits of the PUF response are identified and corrected by more reliable output bits of the PUF.

Said electronic device being configured for having access to a memory storing said repair list comprising at least one match between a response bit and an additional output bit, the step of generation of a PUF response may comprise replacing in the PUF response said matched response bits with the matching additional output bits in the repair list.

It enables to make the corrections of the PUF response permanent, without having to determine again all required corrections at each new generation of a PUF response.

Said additional output bit may be bits among the most reliable output bits of said physical unclonable function.

It enables to make sure that the additional bits used to correct the PUF response are stable enough so that the PUF circuits will provide a steady PUF response after the correction is applied.

In a first embodiment of the method according to the first aspect wherein said device is configured for having access to a memory storing a reference hash value of said response bits, the step of detecting an error in the PUF response may comprise:
generating a hash value by applying a hash function on said bits of the PUF response,
comparing said hash value with said stored reference hash value.

It enables to simply identify if there is an error in the PUF response without storing the PUF response itself.

In a second embodiment of the method according to the first aspect, the step of detecting an error in the PUF response may comprise using an error correcting code.

The step of determining erroneous response bits of the PUF response to be repaired may comprise: replacing one by one each bit of the PUF response by an arbitrary value and determining if the error in the PUF response is corrected.

It enables to minimize the computations required to find the erroneous bits of the PUF response.

In a first embodiment, replacing each bit may be performed in a random order.

Doing so prevents an attacker from gaining knowledge about the index of the erroneous bits from the time spent to identify them.

In a second embodiment, replacing each bit is performed in a predetermined order.

In an embodiment of the method according to the first aspect wherein said device is configured for having access to a memory storing a Preventive toggling list of the least reliable response bits of said physical unclonable function, the step of determining erroneous response bits of the PUF response to be repaired comprises replacing first bits of the Preventive toggling list before replacing other bits of the PUF response.

By doing so, the identification of the erroneous response bits is made faster by reducing the number of response bits to be replaced before the erroneous bits are found.

According to a second aspect, the invention relates to an electronic device comprising active electronic primitives, PUF circuits generating a PUF response by running a physical unclonable function, a processor and at least one memory configured to perform the steps of the method according to the first aspect.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF EMBODIMENTS OF THE INVENTION

The invention aims at repairing response bits of a Physically Unclonable Function (PUF) of an electronic device.

Figure 1:
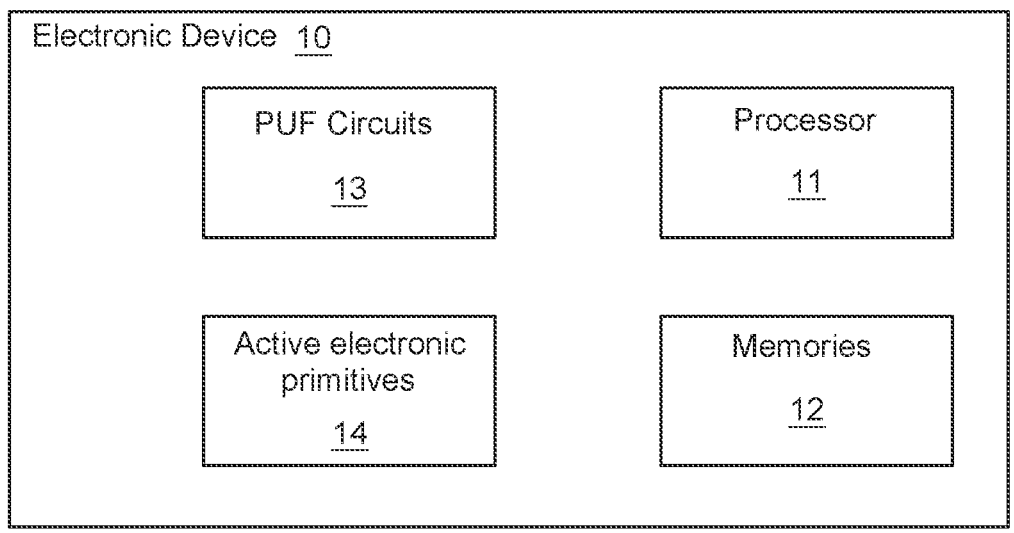
FIG. 1 depicts schematically an example of an electronic device according to the present invention.

As shown on FIG. 1, the electronic device 10 includes a processor 11 and at least one memory 12. It also include PUF circuits 13 in charge of running the physical unclonable function and generating a PUF response from a challenge. The electronic device also includes a plurality of active electronic primitives 14 from which the PUF response will be generated. In this document, a primitive is an active electronic unit or electronic component. Preferably, the primitive is a basic electronic unit. For example primitives may be transistors, vias, resistances, capacitors, ring oscillators or SRAM cells.

In the following examples, the electronic device is a chip but it could be any other kind of integrated circuit, system-on-a-chip (SOC) or printed circuit board (PCB). It may for example be a RFID tag.

Each bit of a PUF response of a device including a PUF function is usually generated based on a comparison between the outputs of two primitives of the device. In order to guarantee the unpredictability and uniqueness of the PUF function, such primitives are usually designed as identical but in fact behave slightly differently because of microstructure differences depending on random process variations during manufacture. The distribution of the electrical characteristics of a set of primitives usually follows a normal law.

The output of a bit of the PUF, derived from a comparison between outputs of two primitives, may be unstable if the result of such a comparison varies, for example depending on environmental conditions such as temperature. As a result only the most stable output bits of the PUF shall be used for generating a stable PUF response. For example an output bit may be qualified as stable only when the corresponding primitives provide outputs sufficiently far from each other so that the sign of the comparison between them remains stable despite small variations of these two output values. The output bits of the PUF selected for generating the PUF response are called response bits in the following paragraphs. The remaining output bits of the PUF are not used for generating the PUF response. Nevertheless, even though these other output bits were not selected in the first place for the generation of the PUF response because other output bits were deemed more stable, some of them may be stable enough to be used for generating a PUF response if needed. The main idea of the invention is that when a PUF response bit is not stable anymore or was permanently damaged, it may be permanently replaced in the PUF response by another output bit providing the same value than the one the damaged response bit used to provide. By doing so, the unstable output bit is not used anymore to generate the PUF response.

In this document, the output bits used as replacement for erroneous response bits are called additional output bits. In order to make the correction of the PUF response efficient and stable, they shall be stable. In order to do so, the additional output bit may be bits among the most reliable output bits of said physical unclonable function.

Figure 2:
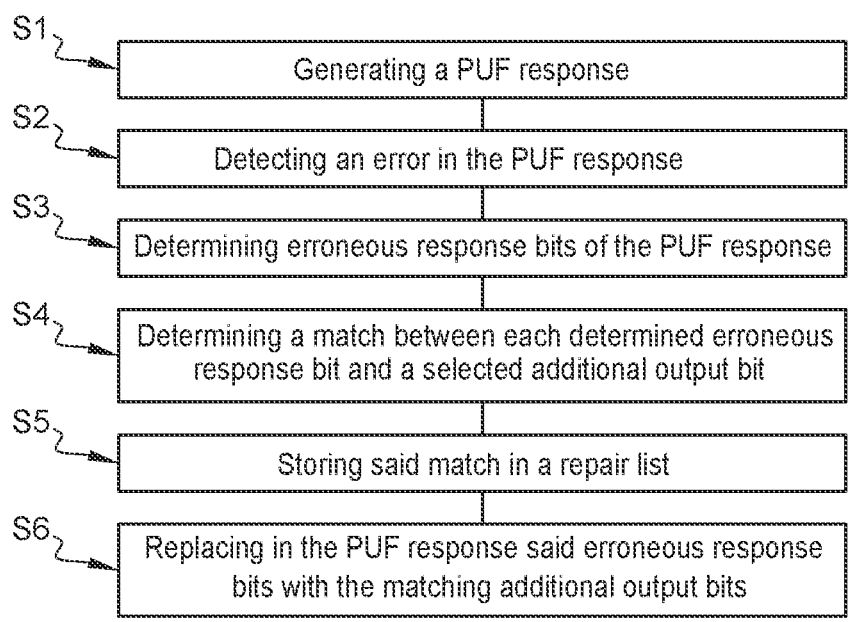
FIG. 2 is a schematic illustration of a method for repairing response bits of a physical unclonable function of the electronic device according to an embodiment of the present invention.

According to a first aspect, the invention relates to a method for repairing response bits of a physical unclonable function of the electronic device 10. The steps of this method are described in details in the following paragraphs and shown on FIG. 2.

In a first step S1, the PUF circuits 13 generate a PUF response to a challenge from the PUF response bits. This challenge is transmitted to the PUF circuits by the processor 11 of the electronic device 10. It may be a predefined challenge stored in a memory of the electronic device. Alternatively the challenge may be transmitted to the electronic device by a remote device.

In a second step S2, the PUF circuits detect an error in the PUF response.

In a first embodiment, the PUF circuits may detect an error in the PUF response by using an error correcting code.

Figure 3:
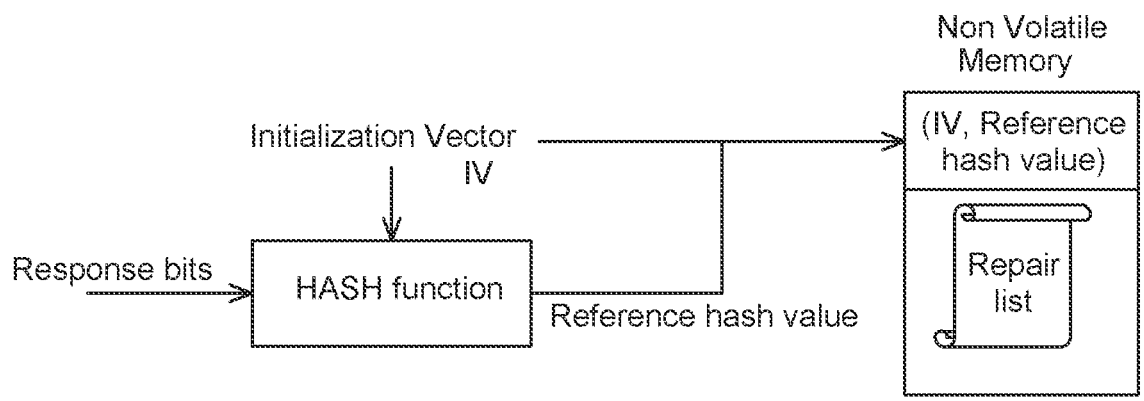
FIG. 3 depicts schematically an example of a processing of a reference hash value in factory according to an embodiment of the invention.

In a second embodiment, a reference hash value of the response bits is stored in a memory which can be accessed by the electronic device. Such a reference hash value may for example be computed in factory, before the electronic device is handed over to a customer, as shown on FIG. 3. At that time the electronic device has not suffered yet from any ageing effect or attack and the PUF response generated by the PUF circuits can be used as a future reference. Such a reference hash value may for example be stored in a non-volatile memory 12 of the electronic device, or may be stored in an external NVM memory which the electronic device can access through a wired or wireless connection such as a communication network. An initialization vector used for initializing the hash function may be stored with the reference hash value.

In such an embodiment, at the time of the second step, in order to detect an error in the PUF response, the PUF circuits may generate a hash value by applying a hash function on the bits of the PUF response, and compare the generated hash value with the stored reference hash value.

Such a step may be performed each time the PUF circuits are requested to generate a PUF response value.

In a third step S3, the PUF circuits determine erroneous response bits of the PUF response.

When the PUF circuits use an error correcting code, such an ECC may be used to determine which response bits of the PUF response are erroneous and to be repaired.

Alternatively, the PUF circuits may replace one by one each bit of the PUF response by an arbitrary value and determine if the error in the PUF response is corrected by comparing a hash of the modified PUF response with the reference hash value. If multiple bits are erroneous in the PUF response, multiple bits may be replaced by their complement at the same time in order to determine all the erroneous bits of the PUF response.

Replacing each bit may be performed in a random order in order to prevent an attacker from deducing the index of erroneous bits from the time spent for identifying them.

Alternatively it may be performed in a predetermined order. For example, advantage can be taken of knowledge about how reliable the PUF response bits are to test the least reliable bits first. In order to do so, the electronic device may have access to a memory storing a Preventive toggling list of the least reliable PUF response bits, and determining erroneous response bits of the PUF response to be repaired may comprise replacing first the bits of the Preventive toggling list before replacing other bits of the PUF response. During the life of the electronic device, the Preventive toggling list may be regularly updated by re-assessing the reliability of all the output bits used to generate the PUF response.

Such a use of a preventive toggling list may be used as a way to detect fault attacks. Indeed, when the PUF response becomes erroneous but none of the output bits of the preventive toggling list is responsible for it, the electronic device has probably undergone a fault attack and the PUF circuits may be configured to raise an alarm to the processor of the electronic device.

Preferably, the reference hash value is read from the NVM memory in which it is stored only once, at the second step, and then stored in a volatile memory of the electronic device for subsequent reading in the next steps.

In a fourth step S4, the PUF circuits determine a match between each determined erroneous response bit and a selected additional output bit such that replacing the erroneous response bits by the matching additional output bits corrects the error in the PUF response. By doing so, a replacement bit is identified among the PUF additional output bits for each PUF response bit that is not stable and correct anymore.

When the erroneous response bits are determined in the third step by a comparison to the reference hash value, the third step and the fourth step may be performed altogether by replacing one by one each bit of the PUF response by the value from an additional output bit. By doing so, when erroneous bits are found, the additional output bits to be used as replacement are already identified.

In a fifth step S5, the determined match is stored. In the rest of this document, the object in which it is stored is called a repair list, even though this object is not restricted to a list and may be of another format such as a matrix, a table, an array . . . . This list may be stored in a memory 12 of the electronic device or at a distant location. It may be stored at the same location than the reference hash value, as shown on FIG. 3. In order to avoid matching a single additional output bit to multiple erroneous response bits, and to prevent any malicious modification of the matching stored in it, the repair list may be such that each additional output bit may be matched with only one response bit and it may be one-time-programmable.

In a sixth step S6, the PUF circuits replace in the PUF response the erroneous response bits with the matching additional output bits in the repair list.

After the third step has been performed, erroneous response bits have been identified and the PUF response may already be corrected without waiting for matching additional output bits to be identified and the matching to be stored. As a result a corrected PUF response may be issued by the PUF circuits to the processor of the electronic device at the end of the third step after toggling the erroneous response bits, for example by performing a XOR of the PUF response with a correction vector having 1 at the index of the determined erroneous bits and 0 elsewhere. In such a case, the identified matching between erroneous response bits and additional output bits to be used as correction is only used for correcting the PUF response at subsequent generations of the PUF response. Applying it at all next generations of the PUF response makes such a correction permanent.

Such a method may be applied repeatedly at successive generations of the PUF response. Consequently, when the first step of generating a PUF response is performed, erroneous response bits may already have been identified during a previous execution of the steps of the method and the electronic device may have access to a memory storing a repair list already comprising at least one match between a response bit and an additional output bit. In order to take into account the correction required following this previous execution, the first step of generation of a PUF response may comprise replacing in the PUF response the matched response bits with the matching additional output bits in the repair list.

Figure 4:
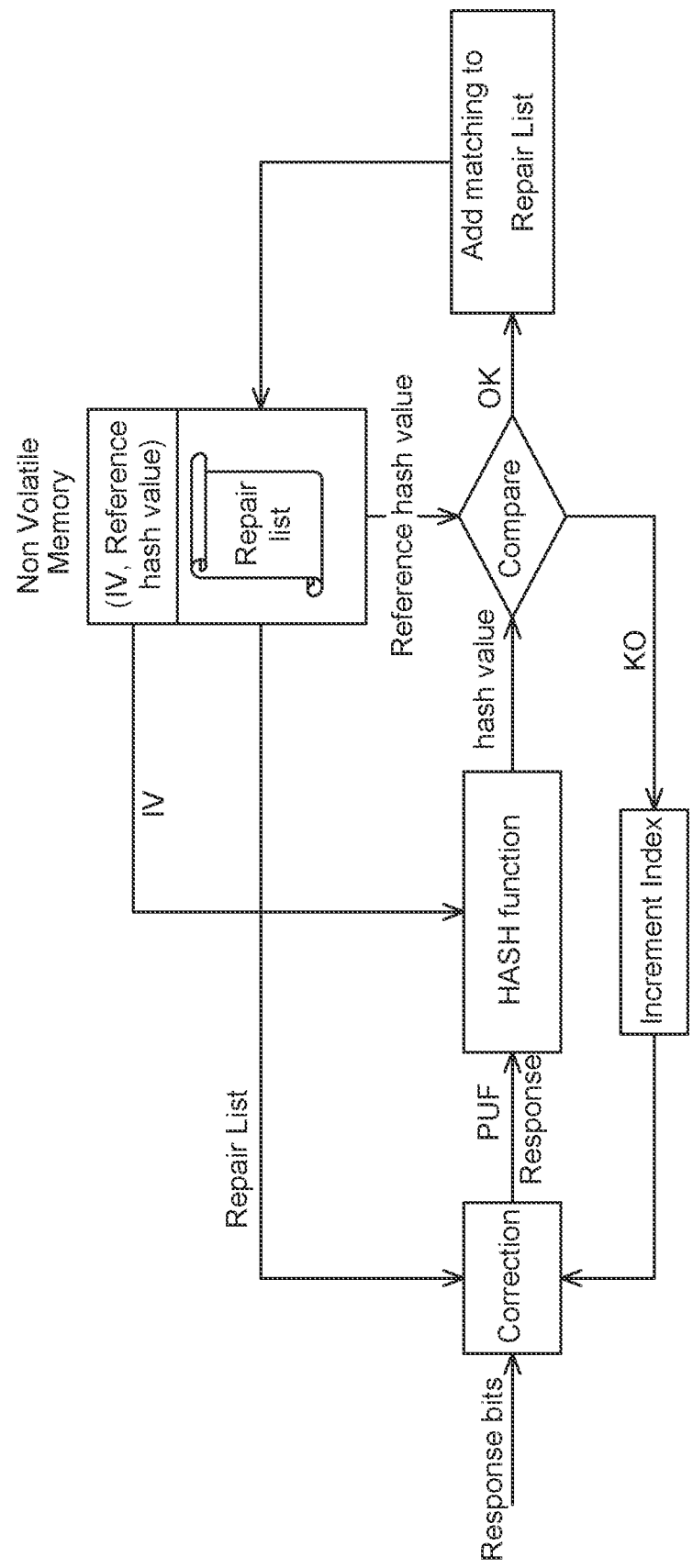
FIG. 4 is a schematic illustration of an embodiment of the invention.

An example is given on FIG. 4, in which the PUF response bits are first corrected according to the matching stored in the repair list, then if at least a new error is found, the bits of the PUF response are replaced one by one and each time a new hash value of the PUF response is computed and compared to the reference hash value. When a successful correction and a matching additional output bit is identified, the matching is stored in the repair list.

In some cases, it is possible that no additional output bit, that is to say the bits stable enough to be used as replacement bits for erroneous output bits, is available. Such a case may for example happen when all the output bits qualified as additional output bits are registered in the repair list as matching an erroneous output bit, i.e. they are all already used for correcting erroneous response bits detected at previous executions of the method. It may also be the case when no output bit, apart from the original response bits, has been identified as stable enough to qualify as additional output bit. In such case, if at least one new erroneous response bit has been identified at the third step, the PUF circuits will fail to determine a match between this erroneous response bit and an available additional output bit during the fourth step. The PUF response can still be instantaneously corrected by toggling the identified new erroneous bit but the new erroneous output bit cannot be permanently replaced by a more stable output bit for generating the PUF response. In such a case the PUF circuits may send a warning to the processor of the electronic device.

The method according to the invention may be applied at each generation of the PUF response. Alternatively, previously identified matching may be applied at each generation of the PUF response but the research of new errors and corrections to be applied may be performed only once in a while after a predetermined number of PUF response generations for example.

According to a second aspect, the invention relates to an electronic device 10 comprising active electronic primitives 14, PUF circuits 13 generating a PUF response by running a physical unclonable function, a processor 11 and at least one memory 12 configured to perform the steps of the method described here above, as shown on FIG. 1.

The invention claimed is:

1. A method for repairing response bits of a physical unclonable function of an electronic device, said physical unclonable function outputting said response bits and additional output bits,
said method comprising the following steps:
generating a PUF response from said response bits (S1),
detecting an error in the PUF response (S2),
determining erroneous response bits of the PUF response (S3) comprising replacing one by one, in a random order, each bit of the PUF response by an arbitrary value and determining if the error in the PUF response is s corrected,
determining a match (S4) between each determined erroneous response bit and a selected additional output bit such that replacing the erroneous response bits by the matching additional output bits corrects the error in the PUF response,
storing said determined match in a repair list (S5),
replacing (S6) in the PUF response said erroneous response bits with the matching additional output bits in the repair list.

2. The method according to claim 1, wherein said electronic device is configured for access to a memory storing said repair list comprising at least one match between a response bit and an additional output bit, the step of generation of a PUF response (S1) comprises replacing in the PUF response said matched response bits with the matching additional output bits in the repair list.

3. The method of claim 1, wherein said additional output bit are bits among most reliable output bits of said physical unclonable function.

4. The method of claim 1, wherein said device is configured for access to a memory storing a reference hash value of said response bits, detecting an error in the PUF response (S2) comprises:
generating a hash value by applying a hash function on said bits of the PUF response,
comparing said hash value with said stored reference hash value.

5. The method of claim 3, wherein detecting an error in the PUF response (S2) comprises using an error correcting code.

6. A method for repairing response bits of a physical unclonable function of an electronic device, said physical unclonable function outputting said response bits and additional output bits,
said method comprising the following steps:
generating a PUF response from said response bits (S1),
detecting an error in the PUF response (S2),
determining erroneous response bits of the PUF response (S3) comprising replacing one by one, in a redetermined order, each bit of the PUF response by an arbitrary value and determining if the error in the PUF response is corrected,
determining a match (S4) between each determined erroneous bit and a selected additional output bit such that replacing the erroneous response bits by the matching additional output bits corrects the error in the PUF response,
storing said determined match in a repair list (S5),
replacing (86) in the PUF response said erroneous response bits with the matching additional output bits in the repair list.

7. The method according to claim 6, wherein said device being configured for having access to a memory storing a Preventive toggling list of the least reliable response bits of said physical unclonable function, determining erroneous response bits of the PUF response to be repaired (S3) comprises replacing first bits of the Preventive toggling list before replacing other bits of the PUF response.

8. The method according to claim 6, wherein said electronic device is configured for access to a memory storing said repair list comprising at least one match between a response bit and an additional output bit, the step of generation of a PUF response (S1) comprises replacing in the PUF response said matched response bits with the matching additional output bits in the repair list.

9. The method of claim 6, wherein said additional output bit are bits among most reliable output bits of said physical unclonable function.

10. The method of claim 6, wherein said device is configured for access to a memory storing a reference hash value of said response bits, detecting an error in the PUF response (S2) comprises:
generating a hash value by applying a hash function on said bits of the PUF response, comparing said hash value with said stored reference hash value.

11. The method of claim 9, wherein detecting an error in the PUF response (S2) comprises using an error correcting code.

12. An electronic device comprising active electronic primitives, PUF circuits generating a PUF response by running a physical unclonable function outputting response bits and additional output bits, a processor and at least one memory configured to perform the steps of:
generating a PUF response from said response bits (S1),
detecting an error in the PUF response (S2),
determining erroneous response bits of the PUF response (S3) comprising replacing one by one, in a random order, each bit of the PUF response by an arbitrary value and determining if the error in the PUF response is corrected,
determining a match (S4) between each determined erroneous response bit and a selected additional output bit such that replacing the erroneous response bits by the matching additional output bits corrects the error in the PUF response,
storing said determined match in a repair list (S5),
replacing (S6) in the PUF response said erroneous response bits with the matching additional output bits in the repair list.

13. The electronic device of claim 12 wherein detecting an error in the PUF response (S2) comprises using an error correcting code.

14. An electronic device comprising active electronic primitives, PUF circuits generating a PUF response by running a physical unclonable function outputting response bits and additional output bits, a processor and at least one memory configured to perform the steps of:
generating a PUF response from said response bits (S1),
detecting an error in the PUF response (S2),
determining erroneous response bits of the PUF response (S3) comprising replacing one by one, in a predetermined order, each bit of the PUF response by an arbitrary value and determining if the error in the PUF response is corrected,
determining a match (S4) between each determined erroneous response bit and a selected additional output bit such that replacing the erroneous response bits by the matching additional output bits corrects the error in the PUF response, storing said determined match in a repair list (S5), replacing (S6) in the PUF response said erroneous response bits with the matching additional output bits in the repair list.

\* \* \* \* \*